United States Patent [19]

Shimizu

[11] Patent Number: 4,502,763
[45] Date of Patent: Mar. 5, 1985

[54] WATERPROOF BODYTUBE FOR BINOCULARS AND THE LIKE

[75] Inventor: Fumio Shimizu, Minowa, Japan
[73] Assignee: Light Koki Co., Ltd., Nagano, Japan
[21] Appl. No.: 406,941
[22] Filed: Aug. 10, 1982
[30] Foreign Application Priority Data
 Sep. 24, 1981 [JP] Japan .................... 56-141567[U]
[51] Int. Cl.³ ............................................ G02B 23/22
[52] U.S. Cl. .................................. 350/582; 350/589
[58] Field of Search ................ 350/589, 582, 545; 354/64

[56] References Cited

U.S. PATENT DOCUMENTS 2,454,859 11/1948 Case .................................. 350/589
3,246,563 4/1966 Quammen et al. ................ 350/589
3,412,661 11/1968 Soumar ............................. 350/64
4,415,235 11/1983 Coates ........................... 350/589 X

FOREIGN PATENT DOCUMENTS 0854072 11/1960 United Kingdom ............. 350/589

*Primary Examiner*—John K. Corbin
*Assistant Examiner*—Lynn Vandenburgh Kent
*Attorney, Agent, or Firm*—Armstrong, Nikaido, Marmelstein & Kubovcik

[57] ABSTRACT

A waterproof bodytube having a division in its intermediate portion to be used to insert a Porro prism into the binoculars. The construction of this invention is such that a male bodytube having a projection portion is fitted to a female bodytube by means of a packing, and a screw is tightened from its outer surface by means of a packing. For this arrangement, the head of the screw is positioned at the side surface of the bodytube, and this portion is normally covered with a film so that the exposure of the screw can be prevented.

1 Claim, 5 Drawing Figures

WATERPROOF BODYTUBE FOR BINOCULARS AND THE LIKE

This invention relates to a waterproof bodytube having a division at an intermediate portion to be used for a binoculars of waterproof type, particularly, Porro prism type binoculars.

In the Porro prism type binoculars, the Porro prism is bigger than the object lens and is nonround. the ocular lens and the Porro prism are housed in the intermediate portion of the bodytube, and therefor the bodytube is divided at the intermediate portion to provide ready access. Accordingly, in order to make the bodytube as a waterproof unit, it is necessary to sandwich packing in this division line and to apply pressure thereto to seal the bodytube.

Heretofore, the pressing of the packing is effected by clamping the division line by means of a screw extending in the axial direction of the bodytube. In such an arrangement, the head of the screw is exposed either at the ocular lens side or the object lens side of the prism portion of the binoculars. This spoils the appearance of the binoculars which is a drawback.

An object of the present invention is to eliminate the foregoing drawback. The present invention includes a waterproof bodytube for binoculars and the like comprising a female bodytube having an end surface, a male bodytube abutting said end surface and fitting partially into said female bodytube, inserted between said male bodytube and said female bodytube, a packing projection portion projecting from the male bodytube and fitting an inner surface of the female bodytube, a hole extending through the projection portion from an outer surface of the female bodytube, a screw to be screwed to the hole from the outer surface of the female bodytube, and a further packing sealing said screw.

This invention will be described by referring to an example employed in the Porro prism type binoculars shown in the drawings.

The drawings show the preferred embodiments of this invention. However, it should be noted that various modifications can be made from the constructions disclosed herein, and should not be construed that the drawings and the descriptions specify or limit the scope of this invention.

BRIEF DESCRIPTION OF THE DRAWINGS

The drawings show an example of this invention.

DETAILED DESCRIPTION OF THE INVENTION

Figure 1:
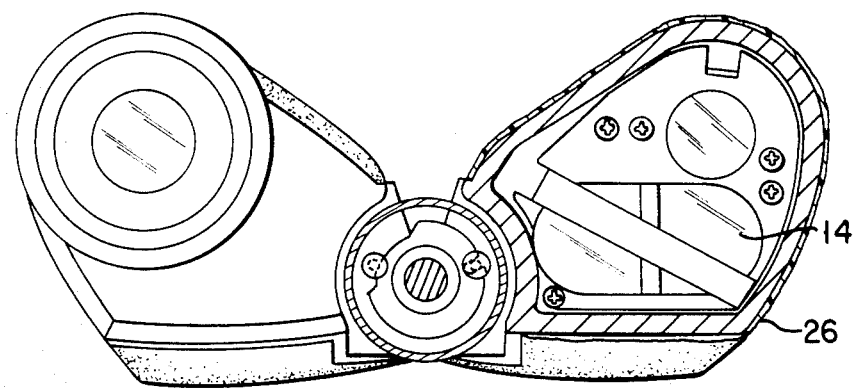
FIG. 1 is a partial cross-section of an end view of binoculars employing the present invention.
Figure 2:
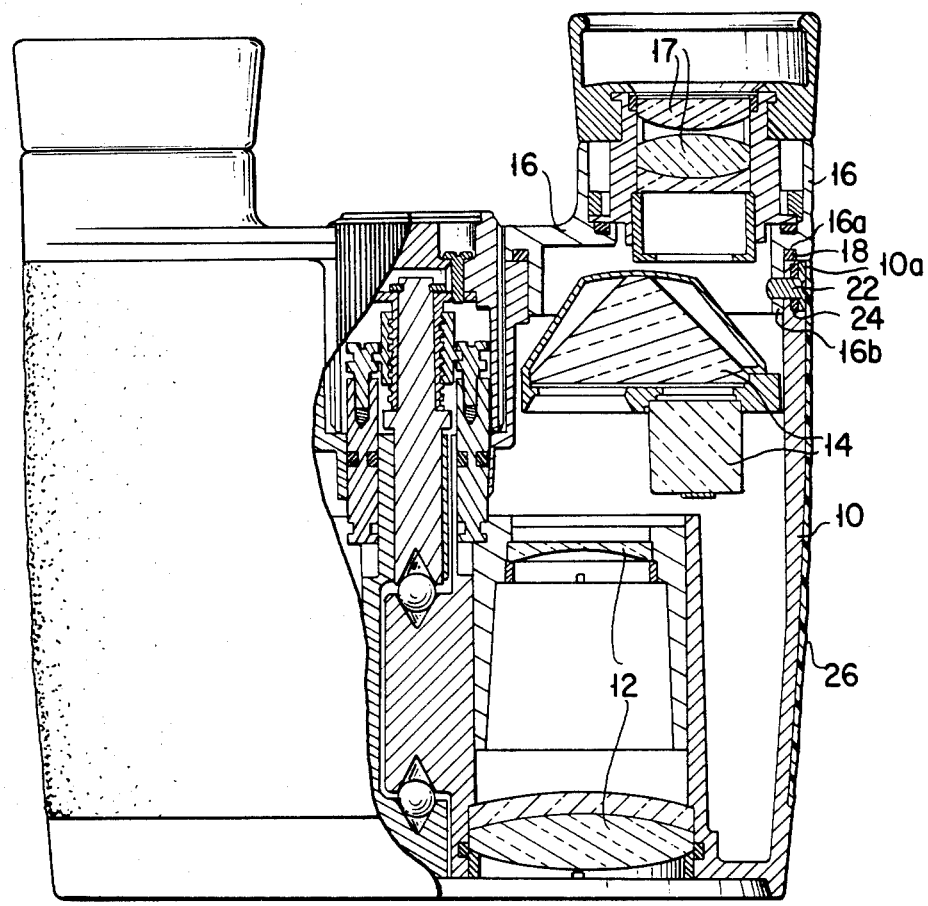
FIG. 2 is a partial cross-section of an elevational view.
Figure 3:
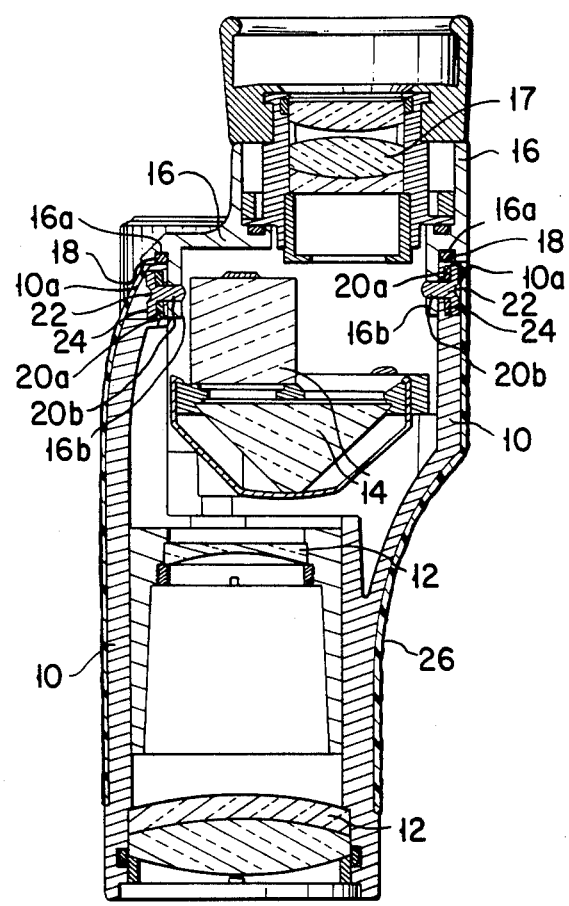
FIG. 3 is a side cross section.
Figure 4:
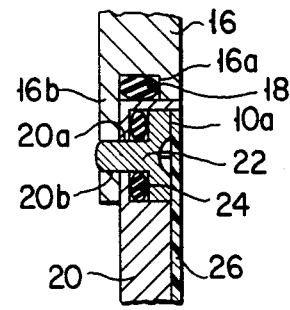
FIG. 4 is an enlarged view of an essential portion of FIG. 3.
Figure 5:
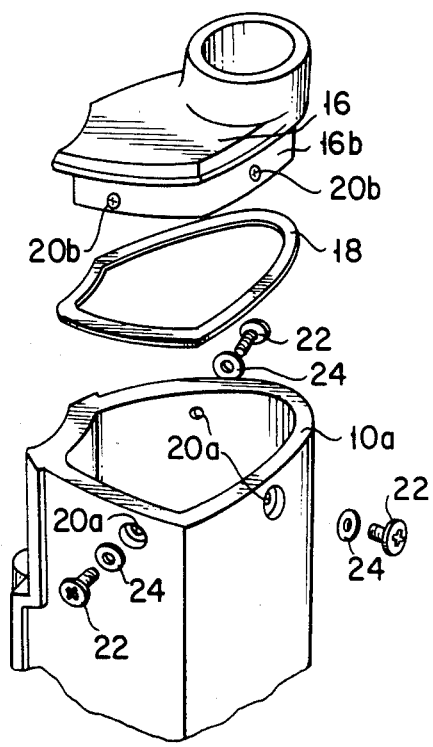
FIG. 5 is an exploded view in perspective of a portion of the structure.

A female nonround bodytube 10 houses an object lens group 12 and a Porro prism 14 and opens at an end surface 10a. The nonround Porro prism 14 can be inserted through the opening so formed. A male bodytube 16 houses an ocular lens group 17. An angular groove 16a is formed at an end surface portion of the male body tube 16. The male bodytube 16 abuts on the end surface 10a of the female bodytube 10 and has a packing 18 fitted to the angular groove 16 therebetween. The projection portion 16a projects from the end surface portion of the male bodytube 16, and fits the inner surface of the female bodytube 10. A hole 20a is provided in the vicinity of an end surface of the female bodytube 10, and a hole 20b is provided in the projection portion 16b of the male bodytube 16. A screw 22 is screwed to the holes 20a and 20b from the outer surface of the female bodytube 10 and has a further packing 24 surrounding its shank. The head of the screw 22 and the packing 24 are embedded in the female bodytube 10 so as not to project on the outer surface. A film covering 26 is provided over the outer periphery of the female bodytube.

This bodytube has the foregoing construction and the head of the screw 22 is positioned on the side surface of the bodytube. The side surface portion of the bodytube is generally covered with the film so that the head of the screw is easily covered by the construction that the head of the screw is embedded as described in the foregoing. This provides an excellent appearance. Also, in this bodytube, there is no item that projects on the end surface portion of the female bodytube which facilitates the inserting operation of the prism and the like, and an effect of making the external shape to an extreme compactness can be obtained.

Since the bodytube of this invention has the foregoing features, it is an optimum bodytube for the Porro prism type binoculars, but it can be also used for monocle, spotting scope and the like.

What is claimed is:

1. A waterproof nonround bodytube for binoculars and the like comprising a female bodytube having an end surface, a male bodytube having a projection portion fitting partially into said female bodytube and abutting said end surface, a packing inserted between said male bodytube and said female bodytube, a screw extending through a hole in said female bodytube and threadedly engaging the projection portion of said male bodytube, a packing sealing said screw, and a film covering on said female bodytube covering said screw.

* * * * *